Jan. 16, 1951 W. J. MacARTHUR 2,538,207
PUMP PACKING
Filed Jan. 6, 1947

INVENTOR.
WILLIAM J. MacARTHUR
BY
ATTORNEY

Patented Jan. 16, 1951

2,538,207

UNITED STATES PATENT OFFICE 2,538,207

PUMP PACKING

William J. MacArthur, Los Angeles, Calif.

Application January 6, 1947, Serial No. 720,342

1 Claim. (Cl. 286—30)

My invention relates to means for preventing leakage about the rods of pumps, and it is particularly applicable to pumps of large size and operating at high pressure, such as are used customarily with oil pipe lines.

The present invention is an improvement of the device disclosed in U. S. Patent 2,230,501 which issued to me February 4, 1941.

An object of my invention is to reduce in amount the leakage which occurs through a pump packing of the type described in the above identified patent.

Another object of my invention is to render unnecessary the precise fitting of certain surfaces in a pump packing of that type.

Further objects and advantages of my invention will be apparent from the following description and from the drawings, in which.

Figure 1:
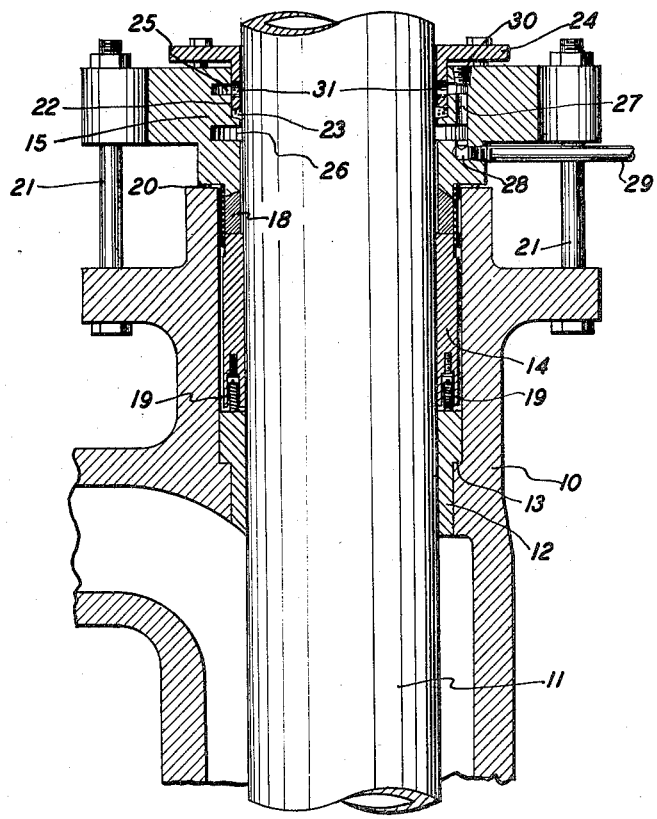
Fig. 1 is a longitudinal section of a pump packing employing my invention.
Figure 2:
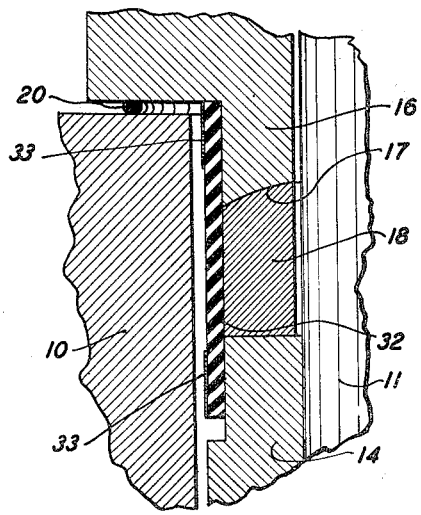
Fig. 2 is an enlarged detail from Fig. 1.

Referring to Figs. 1 and 2, 10 is a packing box formed integrally with the end of a pump casing, and 11 is the pump rod. Bushing 12 is bored to a free sliding fit on pump rod 11 and is provided with a shoulder 13 which fits aginst a corresponding shoulder on the interior of the packing box.

Packing sleeve 14, which is of metal or other rigid material, is formed to a snug sliding fit on pump rod 11 and is very loosely fitted within the packing box, the radial clearance between the sleeve and the packing box being from $\frac{1}{32}$ to $\frac{1}{16}$ of an inch.

Gland 15, which fits the end of packing box 10, is provided with a projection 16 (more clearly shown in Fig. 2) extending into the bore of the packing box. The end surface of this projection is formed to a spherical arc as at 17. Between sleeve 14 and projection 16 is placed ball-joint ring 18, one end of which is squared to fit the squared outer end of sleeve 14, while the other end is formed to a spherical arc to fit the end of projection 16. The inner end of sleeve 14 is equipped with a number of springs 19—19 which urge the sleeve away from bushing 12 and keep the sleeve in contact with ball-joint ring 18 and the ring in contact with projection 16.

A gasket 20, preferably of soft copper wire, is placed between gland 15 and the end of packing box 10; when retaining bolts 21—21 are tightened this gasket forms a leak-proof seal.

A secondary packing box 22 is formed in gland 15 and a ring 23 of soft packing material is retained within the secondary packing box by means of secondary gland 24. Gland 15 is provided with a pair of annular channels 25 and 26, one on each side of packing ring 23, and with drilled holes 27 and 28 which connect channels 25 and 26 with drainage tube 29. The outer end of hole 27 is closed by plug 30.

Secondary gland 24 is provided with a number of ports 31—31 which permit liquid wiped from rod 11 by packing ring 23 to pass into channel 25.

The structure described above is substantially the same as that disclosed in the above-mentioned Patent 2,230,501. In this, leakage between the pump rod and sleeve 14 is prevented by the close fit between these two parts. Because of the freedom of motion of sleeve 14 with respect to packing box 10, the close fit can be maintained without binding the pump rod or causing abrasion, in spite of vibration and other forces causing temporary improper alignment of the rod. The annular space surrounding sleeve 14 is, of course, full of fluid under pressure; however, the design of ball joint ring 18 allows the joints at each end of the ring to remain closed in spite of any misalignment of the pump rod.

Unavoidably a small amount of fluid passes through the primary packing structure. The function of secondary packing 23 and the associated structure is to prevent accumulation of escaped fluid on the pump rod, which (particularly when the pumped fluid is oil) would constitute a nuisance. Since packing ring 23 is not exposed to fluid pressure, it functions as a rod wiper rather than as a true packing; the fluid which it wipes from the rod passes into channels 25 and 26 and thence into drainage tube 29 by which it is conducted away from the pump.

Figure 3:
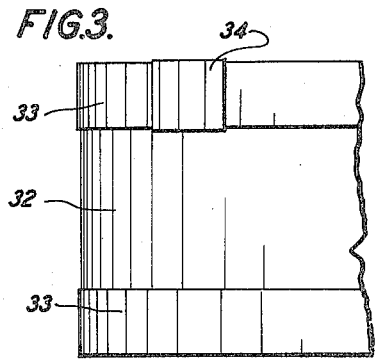
Fig. 3 is a view in elevation of a fragment of the sealing means used in my invention.

In operation the above-described device has functioned well, but I have found a way of reducing the amount of leakage and also of obviating the necessity of extremely precise fitting of the surfaces at each end of ball-joint ring 18. The improvement consists in fitting a cylindrical piece of flexible and fluid-impervious material 32 over the outside of ball-joint ring 18 and the adjacent portions of sleeve 14 and projection 16, the annular space between packing box 10 and these parts being enlarged sufficiently to accommodate the new member. The ends of cylindrical member 32 are forced into tight engagement with projection 16 and with the upper end of sleeve 14 by means of steel hoops 33—33, which themselves are held tight by buckles as illustrated at 34 in Fig. 3.

I prefer to make sealing band 32 of neoprene (the polymerization product of 2-chloro-butadiene 1,3) but other synthetic rubbers having good resistance to oil and to heat are also suitable for the purpose.

It has been found in practice that the use of sealing band 32 greatly reduces leakage even when the surfaces at the ends of ball-joint ring are not ground in as has been necessary heretofore. The device has functioned successfully at pressures of 1100 pounds per square inch and temperatures of 250° F., and when neoprene is used the sealing band functions indefinitely without substantial deterioration. The slight swelling to which neoprene is subject upon prolonged contact with oil does no harm, and it may even be advantageous through increasing the tightness of the seal.

I claim as my invention:

In a pump packing having a rigid sleeve closely fitting the pump rod, a packing box surrounding said sleeve and spaced therefrom, a gland surrounding said pump rod and spaced therefrom, affixed to the outer end of said packing box to form a fluid-tight seal therewith, and having an annular projection extending into the space between said packing box and said pump rod, and a ball-joint ring abutting said sleeve at one end and abutting said gland projection at the other end, the improvement comprising: a cylindrical piece of flexible, fluid-impervious material fitting over the outer surface of said ball-joint ring and over adjacent portions of the outer surfaces of said sleeve and said gland projection; and means for holding said cylindrical piece in tight engagement with said sleeve and said gland projection.

WILLIAM J. MacARTHUR.

REFERENCES CITED

The following references are of record in the file of this patent:

UNITED STATES PATENTS

| Number | Name | Date |
|---|---|---|
| 1,529,874 | Culbertson | Mar. 17, 1925 |
| 1,851,395 | MacArthur | Mar. 29, 1932 |
| 2,230,501 | MacArthur | Feb. 4, 1941 |
| 2,329,050 | Humphreys | Sept. 7, 1943 |